US012252661B2

(12) United States Patent
Mähling et al.

(10) Patent No.: US 12,252,661 B2
(45) Date of Patent: Mar. 18, 2025

(54) PROCESS FOR PREPARING HOMO- AND COPOLYMERS OF ALKYL (METH)ACRYLATES WITH LOW RESIDUAL MONOMER CONTENT

(71) Applicant: Evonik Operations GmbH, Essen (DE)

(72) Inventors: Frank-Olaf Mähling, Mannheim (DE); Maria Stimeier, Darmstadt (DE); Thomas Schimmel, Shanghai (CN); Stefan Karl Maier, Ober-Ramstadt (DE); Sofia Sirak, Plymouth Meeting, PA (US)

(73) Assignee: Evonik Operations GmbH, Essen (DE)

( * ) Notice: Subject to any disclaimer, the term of this patent is extended or adjusted under 35 U.S.C. 154(b) by 92 days.

(21) Appl. No.: 18/257,675

(22) PCT Filed: Dec. 17, 2021

(86) PCT No.: PCT/EP2021/086447
§ 371 (c)(1),
(2) Date: Jun. 15, 2023

(87) PCT Pub. No.: WO2022/129495
PCT Pub. Date: Jun. 23, 2022

(65) Prior Publication Data
US 2024/0043768 A1    Feb. 8, 2024

(30) Foreign Application Priority Data
Dec. 18, 2020    (EP) .................................. 20215325

(51) Int. Cl.
*C10M 145/14*    (2006.01)
*C08F 293/00*    (2006.01)
(Continued)

(52) U.S. Cl.
CPC ....... *C10M 145/14* (2013.01); *C08F 293/005* (2013.01); *C10M 169/041* (2013.01);
(Continued)

(58) Field of Classification Search
CPC ............ C10M 145/14; C10M 169/041; C10M 2203/003; C10M 2209/084;
(Continued)

(56) References Cited

U.S. PATENT DOCUMENTS 3,772,196 A    11/1973    St. Clair et al.
4,116,917 A    9/1978    Eckert
(Continued)

FOREIGN PATENT DOCUMENTS

CA    3016385 A1 *    3/2019    ............. C08C 19/28
DE    1520696           4/1969
(Continued)

OTHER PUBLICATIONS

Araújo et al., "Techniques for Reducing Residual Monomer Content in Polymers: A Review", Polymer Engineering and Science, vol. 42, No. 7, Jul. 2002, pp. 1442-1468.
(Continued)

*Primary Examiner* — Taiwo Oladapo
(74) *Attorney, Agent, or Firm* — Grüneberg and Myers PLLC (57) ABSTRACT

A method for the preparation of homo- and copolymers of alkyl (meth)acrylates having a low residual monomer content involves preparing a reaction mixture containing monomers, charging the reaction mixture, heating the reaction mixture, adding an additional monomer after initial monomer conversion, and optional further processing of the reaction mixture. The homo- and copolymers of alkyl (meth) acrylates obtained by this method as useful in lubricant applications.

20 Claims, 4 Drawing Sheets

(51) Int. Cl.
*C10M 169/04* (2006.01)
*C10N 20/00* (2006.01)

(52) U.S. Cl.
CPC . *C10M 2203/003* (2013.01); *C10M 2209/084* (2013.01); *C10N 2020/071* (2020.05)

(58) Field of Classification Search
CPC .......... C08F 293/005; C08F 2/38; C08F 4/34; C08F 220/1812; C08F 2/04; C10N 2020/071
See application file for complete search history.

(56) References Cited

U.S. PATENT DOCUMENTS

| | | | |
|---|---|---|---|
| 4,788,316 | A | 11/1988 | Thornthwaite et al. |
| 4,867,894 | A | 9/1989 | Pennewiss et al. |
| 6,599,864 | B1 | 7/2003 | Bertomeu |
| 9,080,124 | B2 | 7/2015 | Scherer et al. |
| 2008/0132663 | A1 | 6/2008 | Acker et al. |
| 2013/0229016 | A1* | 9/2013 | Ghahary ............. C10M 107/28 290/55 |

FOREIGN PATENT DOCUMENTS

| | | |
|---|---|---|
| EP | 0 635 560 | 1/1995 |
| EP | 0 668 342 | 8/1995 |
| EP | 0 776 959 | 6/1997 |
| EP | 1 029 029 | 8/2000 |
| EP | 3 708 640 | 9/2020 |
| JP | 2009-183573 | 8/2009 |
| JP | 2013-56994 | 3/2013 |
| JP | 5264826 | 8/2013 |
| JP | 2020-147613 | 9/2020 |
| WO | 97/21788 | 6/1997 |
| WO | 99/20720 | 4/1999 |
| WO | 99/41332 | 8/1999 |
| WO | 00/08115 | 2/2000 |
| WO | 00/14179 | 3/2000 |
| WO | 00/14183 | 3/2000 |
| WO | 00/14187 | 3/2000 |
| WO | 00/14188 | 3/2000 |
| WO | 00/15736 | 3/2000 |
| WO | 01/18156 | 3/2001 |
| WO | 01/57166 | 8/2001 |
| WO | 2006/007934 | 1/2006 |
| WO | 2013/189951 | 12/2013 |
| WO | WO-2018046380 A1 * | 3/2018 ................ C08F 2/02 |

OTHER PUBLICATIONS

International Search report issued Feb. 28, 2022, in PCT/EP2021/086447, 6 pages.
M. Aerts, "Residual Monomer Reduction in Polymer Latex Products by Extraction with Supercritical Carbon Dioxide", Eindhoven University of Technology, 2012, 146 pages.
Written Opinion issued Feb. 28, 2022, in PCT/EP2021/086447, 13 pages.

* cited by examiner

FIG. 1: Residual monomer contents in the products of experiments 1 to 8.

FIG. 2: Reduction of total residual monomer content.

FIG 3: Reduction of the residual methyl methacrylate content in experiments 1 to 8.

FIG. 4: Correlation of the flash point of the polymers with an increase in residual MMA concentration.

PROCESS FOR PREPARING HOMO- AND COPOLYMERS OF ALKYL (METH)ACRYLATES WITH LOW RESIDUAL MONOMER CONTENT

CROSS-REFERENCE TO RELATED APPLICATIONS

This application is the National Stage entry under § 371 of International Application No. PCT/EP2021/086447, filed on Dec. 17, 2021, and which claims the benefit of priority to European Application No. 20215325.0, filed on Dec. 18, 2020. The content of each of these applications is hereby incorporated by reference in its entirety.

BACKGROUND OF THE INVENTION

Field of the Invention

The present invention is directed to a method for the preparation of homo- and copolymers of alkyl (meth)acrylates having a low residual monomer content, to the homo- and copolymers of alkyl (meth)acrylates obtained by this method and to their use in lubricant applications.

Reducing the residual monomer content is a general desire of polymer producers, as a product with no or very low levels of residual monomer would have a different commercial appeal. The presence of residual monomer may create hazards to workers as a result of long-term exposure during polymer processing and sometimes even to customers. There are several techniques known for reducing residual monomer content, like for example additional initiator shots or post-process treatments. Nevertheless, choosing the best, or the most adequate, technique is not always an easy task, and one still observes a relative lack of scientific literature on this subject. The technique to be employed will depend upon polymer application, which determines the grade of purity, and on polymer quality as well, as some monomer reducing techniques might change polymer properties.

The non-converted or residual monomer is a concern to manufacturers of polyalkyl (meth)acrylates for a number of reasons:
- The polymer is usually the desired product of a polymerization process; hence the conversion rate should be as high as possible to maximize product performance and minimize the specific product costs. A high residual monomer content does usually come along with a low conversion rate.
- The content of residual monomers has an impact on the registration of a polymer, e.g. in environmental and sustainability standards. The residual content of specific monomers or reactants, e.g. of methyl methacrylate monomer, must stay below a certain limit for the EU Ecolabel registration and should be as low as possible in general.
- Low molecular weight organic compounds have a negative impact on odor, flash point and volatility (VOC).

It was therefore an object of the present invention to reduce the overall residual content of monomers, i.e. of methyl methacrylate, in polyalkyl (meth)acrylates, to below 10000 ppm by weight to reach a higher conversion of the desired product and to avoid the disadvantages as mentioned above.

Description of Related Art

U.S. Pat. No. 4,867,894 discloses the production of polyalkyl (meth)acrylate polymers, wherein a mixture of different monomers is charged to a reaction vessel and heated. Subsequently, an initiator is added, and a mixture of further monomers and more initiator is added in. It is silent about the addition of a further additional monomer at the end of the reaction to reduce the residual monomer content.

US 2008/0132663 discloses a process for free-radically polymerizing one or more ethylenically unsaturated compounds, wherein at least 80% by weight of the ethylenically unsaturated compounds being initially charged and at least one polymerization initiator being added in at least two steps, more initiator being added in the second step than in the first step. It is also silent about the addition of a further additional monomer at the end of the reaction to reduce the residual monomer content.

The prior art processes are not able to reduce the residual monomer content to the required level without a subsequent expensive and time-consuming vacuum degassing or stripping step.

It was now surprisingly found that the addition of an additional monomer, e.g. an alkyl (meth)acrylate, at the same time of or a short time before the final addition of a free radical initiator shot is a suitable method to reduce the residual monomer content of a polymer product. More surprisingly, it was found that the largest reduction of residual monomer occurred to the residual monomer content of methyl methacrylate, which improves odor and significantly increases the flash point of the desired polymer.

SUMMARY OF THE INVENTION

The present invention modifies the process in a way that is suitable to achieve the required level without a vacuum degassing or stripping operation.

The present invention can be used to produce polymers of same or different alkyl (meth)acrylates as well as copolymers of same or different alkyl (meth)acrylates and other comonomers that are not alkyl (meth)acrylates (like e.g. styrene), where those polymers have a minimized content of residual monomers.

The low residual monomer content of the polymer makes it the preferred choice for the formulation of lubricants, e.g. including those compliant with the requirements of the EU Ecolabel.

The EU Ecolabel criteria allow a limited percentage of certain substances in the end product, here in the lubricant formulation. The maximum treat rate of an additive is defined accordingly.

A first object of the present invention is directed to a method for preparing polyalkyl (meth)acrylates, comprising the steps of:
  (i) preparing a reaction mixture comprising:
    (A) at least two different alkyl (meth)acrylates;
    (B) optionally, a chain transfer agent; and
    (C) optionally, a base oil;
  (ii) charging the reaction mixture prepared under step (i) to a reaction vessel;
  (iii) heating the reaction mixture to the desired reaction temperature;
  (iv) adding 0.1 wt. % to 4 wt. %, preferably 0.1 wt. % to 2 wt. %, based on the total amount of monomers used, of a free radical initiator 1, either continuously or stepwise;
  (v) adding, after a monomer conversion of at least 95% was achieved, 0.05 wt. % to 0.2 wt. %, based on the total amount of monomers used, of an initiator 2 and less than 1 wt. %, preferred not more than 0.5%, based on the total amount of monomers used, of an additional monomer to the reaction mixture; and (vi) optionally, further processing of the reaction mixture to receive the targeted polyalkyl (meth)acrylates, wherein the conversion is determined by measuring the residual monomer content by HPLC method.

According to the present invention, the residual monomer contents were determined using the following HPLC method with the following test conditions:

Detection: UV, 200 nm
Column: LiChrospher 60-5 Si (125 mm×3 mm, 5 μm)
Eluent: n-hexaneLiChr.:THFLiChr.=99.6:0.4
Flow rate: 0.9 mL/min
Injected volume: 20 μL Quantification is made by using an external, linear multipoint calibration using calibration standards. The calibration standard corresponds to the monomer of which the residual content is determined. A sample is prepared by adding 100 mg of the corresponding monomer to a 25 mL flask that is subsequently filled up with the eluent.

In a further object of the present invention, the alkyl (meth)acrylates (A) comprise:
(a) 0.2 wt. % to 50 wt. % of C1-6 alkyl (meth)acrylates, preferably methyl methacrylate;
(b) 50 wt. % to 99.8 wt. % of C7-20 alkyl (meth)acrylates, preferably C10-15 alkyl methacrylates, more preferably C12-14 alkyl methacrylates; and
(c) 0 wt. % to 10 wt. % of one or more further comonomers.

In a further object of the present invention, the alkyl (meth)acrylates (A) comprise:
(a) 0.2 wt. % to 25 wt. % of C1-6 alkyl (meth)acrylates, preferably methyl methacrylate;
(b) 75 wt. % to 99.8 wt. % of C7-20 alkyl (meth)acrylates, preferably C10-15 alkyl methacrylates, more preferably C12-14 alkyl methacrylates; and
(c) 0 wt. % to 10 wt. % of one or more further comonomers.

The content of each component (a), (b) and (c) is based on the total amount of the alkyl (meth)acrylates. In particular, the proportions of components (a), (b) and (c) add up to 100% by weight.

In a further object of the present invention, the alkyl (meth)acrylates (A) comprise:
(a) 0.2 wt. % to 25 wt. % of C1-6 alkyl (meth)acrylates, preferably methyl methacrylate; and
(b) 75 wt. % to 99.8 wt. % of C7-20 alkyl (meth)acrylates, preferably C10-15 alkyl methacrylates, more preferably C12-14 alkyl methacrylates.

In a further object of the present invention, the alkyl (meth)acrylates (A) comprise:
(a) 10 wt. % to 15 wt. % of C1-6 alkyl (meth)acrylates, preferably methyl methacrylate; and
(b) 85 wt. % to 90 wt. % of C7-20 alkyl (meth)acrylates, preferably C10-15 alkyl methacrylates, more preferably C12-14 alkyl methacrylates.

The content of each component (a) and (b) is based on the total amount of the alkyl (meth)acrylates. In particular, the proportions of components (a) and (b) add up to 100% by weight.

DETAILED DESCRIPTION OF THE INVENTION

The term "(meth)acrylate" refers to both, esters of acrylic acid and esters of methacrylic acid. Methacrylates and mixtures of methacrylates and acrylates are preferred over acrylates.

The C1-6 alkyl (meth)acrylates for use in accordance with the invention are esters of (meth)acrylic acid and straight chained or branched alcohols having 1 to 6 carbon atoms. The term "C1-6 alkyl (meth)acrylates" encompasses individual (meth)acrylic esters with an alcohol of a particular length, and likewise mixtures of (meth)acrylic esters with alcohols of different lengths.

Suitable C1-6 alkyl (meth)acrylates include, for example, methyl (meth)acrylate, ethyl (meth)acrylate, n-propyl (meth)acrylate), iso-propyl (meth)acrylate, n-butyl (meth)acrylate, iso-butyl (meth)acrylate, tert-butyl (meth)acrylate, pentyl (meth)acrylate and hexyl (meth)acrylate.

Particularly preferred C1-6 alkyl (meth)acrylates are methyl (meth)acrylate and n-butyl (meth)acrylate; methyl methacrylate being especially preferred.

The C7-20 alkyl (meth)acrylates for use in accordance with the invention are esters of (meth)acrylic acid and straight chain or branched alcohols having 7 to 20 carbon atoms. The term "C7-20 alkyl methacrylates" encompasses individual (meth)acrylic esters with an alcohol of a particular length, and likewise mixtures of (meth)acrylic esters with alcohols of different lengths.

Suitable C7-20 alkyl (meth)acrylates include, for example, heptyl (meth)acrylate, octyl (meth)acrylate, 2-ethylhexyl (meth)acrylate, nonyl (meth)acrylate, 2-propylheptyl (meth)acrylate, 2-butyloctyl (meth)acrylate, 2-hexyloctyl (meth)acrylate, decyl (meth)acrylate, 2-butyldecyl (meth)acrylate, 2-hexyldecyl (meth)acrylate, 2-octyldecyl (meth)acrylate, undecyl (meth)acrylate, 2-methylundecyl (meth)acrylate, dodecyl (meth)acrylate, 2-methyldodecyl (meth)acrylate, 2-hexyldodecyl (meth)acrylate, 2-octyldodecyl (meth)acrylate, tridecyl (meth)acrylate, 2-methyltridecyl (meth)acrylate, tetradecyl (meth)acrylate, 2-decyltetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth)acrylate, octadecyl (meth)acrylate, nonadecyl (meth)acrylate and eicosyl (meth)acrylate.

The C10-15 alkyl methacrylates for use in accordance with the invention are esters of methacrylic acid and linear or branched alcohols having 10 to 15 carbon atoms. The term "C10-15 alkyl methacrylates" encompasses individual methacrylic esters with an alcohol of a particular length, and likewise mixtures of methacrylic esters with alcohols of different lengths.

The suitable C10-15 alkyl methacrylates include, for example, decyl methacrylate, 2-propylheptyl methacrylate, undecyl methacrylate, 2-methylundecyl methacrylate, dodecyl methacrylate, 2-methyldodecyl methacrylate, tridecyl methacrylate, 2-methyltridecyl methacrylate, tetradecyl methacrylate and/or pentadecyl methacrylate.

Particularly preferred C10-15 alkyl methacrylates are methacrylic esters of a linear C12-14 alkyl alcohol mixture (C12-14 alkyl methacrylate), especially lauryl methacrylate, branched C10-15 alkyl methacrylates or mixtures of linear and branched C10-15 alkyl methacrylates.

The comonomers for use in accordance with the present invention can be selected from the group consisting of styrene monomers having from 8 to 17 carbon atoms, vinyl esters having from 1 to 11 carbon atoms in the acyl group, vinyl ethers having from 1 to 10 carbon atoms in the alcohol group, (di)alkyl fumarates having from 1 to 10 carbon atoms in the alcohol group, (di)alkyl maleates having from 1 to 10 carbon atoms in the alcohol group, dispersing oxygen- and nitrogen-functionalized monomers, and mixtures of these monomers.

Examples of styrene monomers having from 8 to 17 carbon atoms are styrene, substituted styrenes having an alkyl substituent in the side chain, for example alpha-methylstyrene and alpha-ethylstyrene, substituted styrenes having an alkyl substituent on the ring, such as vinyltoluene and para-methylstyrene, halogenated styrenes, for example monochlorostyrenes, dichlorostyrenes, tribromostyrenes and tetrabromostyrenes; preferred is styrene.

Examples of vinyl esters having from 1 to 11 carbon atoms in the acyl group include vinyl formiate, vinyl acetate, vinyl propionate, vinyl butyrate, vinyl 2-ethylhexanoate, vinyl versatate. Preferred vinyl esters include from 2 to 9, more preferably from 2 to 5 carbon atoms in the acyl group. The acyl group here may be linear or branched.

Examples of vinyl ethers having from 1 to 10 carbon atoms in the alcohol group include e.g. vinyl methyl ether, vinyl ethyl ether, vinyl propyl ether, vinyl butyl ether, vinyl octyl ether. Preferred vinyl ethers include from 4 to 8 carbon atoms in the alcohol group. The alcohol group here may be linear or branched.

The notation "(di)ester" means that monoesters, diesters and mixtures of esters, especially of fumaric acid and/or of maleic acid, may be used. The (di)alkyl fumarates having from 1 to 10 carbon atoms in the alcohol group include monomethyl fumarate, dimethyl fumarate, monoethyl fumarate, diethyl fumarate, methyl ethyl fumarate, monobutyl fumarate, dibutyl fumarate, dipentyl fumarate and dihexyl fumarate. Preferred (di)alkyl fumarates comprise from 1 to 8, more preferably from 1 to 4 carbon atoms in the alcohol group. The alcohol group here may be linear or branched.

The (di)alkyl maleates having from 1 to 10 carbon atoms in the alcohol group include monomethyl maleate, dimethyl maleate, monoethyl maleate, diethyl maleate, methyl ethyl maleate, monobutyl maleate, dibutyl maleate. Preferred (di)alkyl maleates comprise from 1 to 8, more preferably from 1 to 4 carbon atoms in the alcohol group. The alcohol group here may be linear or branched.

Examples of dispersing oxygen-functionalized monomers hydroxyalkyl (meth)acrylates, such as 3-hydroxypropyl (meth)acrylate, 3,4-dihydroxybutyl (meth)acrylate, 2-hydroxyethyl (meth)acrylate, 2-hydroxypropyl (meth)acrylate, 2,5-dimethyl-1,6-hexanediol (meth)acrylate and 1,10-decanediol (meth)acrylate.

Examples of dispersing nitrogen-functionalized monomers are aminoalkyl (meth)acrylates, such as N,N-dimethylaminoethyl (meth)acrylate, N,N-dimethylaminopropyl (meth)acrylate, N,N-diethylaminopentyl (meth)acrylate, N,N-dibutylaminohexadecyl (meth)acrylate; aminoalkyl (meth)acrylamides, such as N,N-dimethylaminopropyl (meth)acrylamide; heterocyclic (meth)acrylates, such as 2-(1-imidazoly)ethyl (meth)acrylate, 2-(4-morpholinyl) ethyl (meth)acrylate, 1-(2-methacryloyloxyethyl)-2-pyrrolidone, N-methacryloylmorpholine, N-methacryloyl-2-pyrrolidinone, N-(2-methacryloyloxyethyl)-2-pyrrolidinone, N-(3-methacryloyloxypropyl)-2-pyrrolidinone; heterocyclic vinyl compounds, such as 2-vinylpyridine, 4-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, N-vinylpyrrolidine, 3-vinylpyrrolidine, N-vinylcaprolactam, N-vinylbutyrolactam, vinyloxolane, vinylfuran, vinyloxazoles and hydrogenated vinyloxazoles.

The N-dispersant monomer may specifically be at least one monomer selected from the group consisting of N-vinyl pyrrolidinone, N,N-dimethylaminoethyl methacrylate, and N,N-dimethylaminopropyl methacrylamide.

The weight-average molecular weight of the polyalkyl (meth)acrylate polymers prepared according to the present invention is in the range of 10,000 g/mol to 600,000 g/mol, preferably in the range of 20,000 g/mol to 200,000 g/mol, more preferably in the range of 30,000 g/mol to 150,000 g/mol. The number-average molecular weight of the polyalkyl(meth)acrylate polymers according to the present invention is in the range of 5,000 g/mol to 200,000 g/mol, preferably in the range of 10,000 g/mol to 80,000 g/mol, more preferably in the range of 15,000 g/mol to 60,000 g/mol.

Preferably, the polyalkyl(meth)acrylate polymers according to the present invention have a polydispersity index (PDI) $M_w/M_n$ in the range of 1.5 to 3.5, more preferably in the range of 1.8 to 2.5.

$M_w$ and $M_n$ are determined by size exclusion chromatography (SEC) using commercially available polymethylmethacrylate standards. The determination is performed with gel permeation chromatography with THF as eluent.

Suitable chain transfer agents (B) are especially oil-soluble mercaptans, for example n-dodecyl mercaptane, tert-dodecyl mercaptane, 2-mercaptoethanol and 2-ethylhexyl-thioglycolate, preferably selected from n-dodecyl mercaptane, tert-dodecyl mercaptane or 2-mercaptoethanol, or else chain transfer agents from the class of the terpenes, for example terpinolene; n-dodecyl mercaptan being preferred.

The base oil (C) to be used in the present invention can be selected from the group consisting of API Group I, II, III, IV, V oils and mixtures thereof. They are preferably selected either from API Group V oils or from API Group I, II or III oils and mixtures thereof. Most preferred are API Group II oils.

The reaction vessel mentioned under step (i) can be any suitable reaction vessel that is equipped with a stirrer and a temperature control system under inert gas, preferably under nitrogen atmosphere.

The reaction temperature mentioned under step (iii) is generally in the range of 20° C. to 200° C., preferably 90° C. to 120° C. The polymerization may be carried out at ambient pressure, reduced pressure or elevated pressure, preferred is either ambient or elevated pressure.

One, two, three or more types of free radical initiators can be used either separate or in combination. The initiator 1 and initiator 2 to be used in accordance with the present invention can be identical or different and may be selected from the group consisting of azo initiators, such as azobis-isobutyronitrile (AIBN), 2,2'-azobis(2-methylbutyronitrile) (AMBN) and 1,1-azobiscyclohexanecarbonitrile, and peroxy compounds such as methyl ethyl ketone peroxide, acetylacetone peroxide, dilauryl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethykcyclohexane, cumyl hydroperoxide, tert-butyl hydroperoxide, bis(4-tert-butylcyclohexyl) peroxydicarbonate and 2,2-di(tert-butylperoxy)butane, as well as mixtures of two or more of the aforementioned compounds with one another, and mixtures of the aforementioned compounds with unspecified compounds which can likewise form free radicals.

Preferred initiators 1 and 2 are independently selected from the group consisting of 2,2'-azobis(2-methylbutyronitrile), tert-butylperoxy-2-ethylhexanoate, tert-amylperoxy-2-ethylhexanoate, 1,1-di-tert-butylperoxy-3,3,5-trimethyl-cyclohexane, tert-butyl-peroxybenzoate, 2,2-di(tert-butylperoxy)butane and tert-butylperoxy-3,5,5-trimethylhexanoate, more preferably tert-butylperoxy-2-ethylhexanoate and tert-amylperoxy-2-ethylhexanoate. Especially preferred is tert-butylperoxy-2-ethylhexanoate as initiator 1 and 1.

The additional alkyl (meth)acrylate mentioned under step (v) can be selected from the group consisting of C4-14 alkyl acrylates, C4-14 alkyl methacrylates, C4-14 alkyl maleates, C4-14 alkyl fumarates and styrene. Preferred are 2-ethylhexyl acrylate, styrene and C12-14 alkyl acrylate (lauryl acrylate), preferably C4-14 alkyl acrylates and styrene.

They are preferably more reactive than most of the alkyl (meth)acrylates (A) used to prepare the polymers, oil-soluble and able to form oil-soluble homopolymers. Further preferred are alkyl (meth)acrylates that show a good reactivity with residual methyl methacrylate.

The additional monomer is preferably selected from the group consisting of 2-ethylhexyl acrylate, lauryl methacrylate and styrene, more preferably from 2-ethylhexyl acrylate and styrene.

The term "after a monomer conversion of at least 95% was achieved" is related to an end phase of the polymerization indicated by a slowdown of the heat release by reaction. At this point, the residual monomer content in the product is below 5% (corresponding to a monomer conversion of at least 95%), usually between 1% and 5%, related to the total amount of monomers used in the reaction.

Correspondingly, the conversion was determined by measuring the residual monomer content by HPLC method as described above.

The base oil to be used in accordance with the present invention comprises an oil of lubricating viscosity. Such oils include natural and synthetic oils, oils derived from hydrocracking, hydrogenation, and hydro-finishing, unrefined, refined, re-refined oils or mixtures thereof.

The base oil may also be defined as specified by the American Petroleum Institute (API) (see April 2008 version of "Appendix E-API Base Oil Interchangeability Guidelines for Passenger Car Motor Oils and Diesel Engine Oils", section 1.3 Subheading 1.3. "Base Stock Categories"). The API currently defines five groups of lubricant base stocks (API 1509, Annex E—API Base Oil Interchangeability Guidelines for Passenger Car Motor Oils and Diesel Engine Oils, September 2011). Groups I, II and III are mineral oils which are classified by the amount of saturates and sulphur they contain and by their viscosity indices; Group IV are polyalphaolefins; and Group V are all others, including e.g. ester oils. The table below illustrates these API classifications.

| Group | Saturates | Sulphur content | Viscosity Index (VI) |
|---|---|---|---|
| I | <90% | >0.03% | 80-120 |
| II | at least 90% | not more than 0.03% | 80-120 |
| III | at least 90% | not more than 0.03% | at least 120 |
| IV | Polyalphaolefins (PAOs) | | |
| V | All others not included in Groups I, II, III or IV (e.g. ester oils) | | |

The kinematic viscosity at 100° C. ($KV_{100}$) of appropriate non-polar base oils used in accordance with the present invention is preferably in the range of 1 mm/s to 20 mm/s, more preferably in the range of 1 mm/s to 10 mm/s, more preferably in the range of 1 mm/s to 5 mm/s, determined to ASTM D445.

Further base oils which can be used in accordance with the present invention are Group II-III Fischer-Tropsch derived base oils.

Fischer-Tropsch derived base oils are known in the art. By the term "Fischer-Tropsch derived" is meant that a base oil is, or is derived from, a synthesis product of a Fischer-Tropsch process. A Fischer-Tropsch derived base oil may also be referred to as a GTL (Gas-To-Liquids) base oil.

Suitable Fischer-Tropsch derived base oils that may be conveniently used as the base oil in the compressor oil of the present invention are those as for example disclosed in EP 0 776 959, EP 0 668 342, WD 97/21788, WD 00/15736, WO 00/14188, WD 00/14187, WO 00/14183, WO 00/14179, WO 00/08115, WD 99/41332, EP 1 029 029, WD 01/18156, WO 01/57166 and WO 2013/189951.

The polyalkyl (meth)acrylates prepared according to the method of the present invention can be further processed. Further reaction steps can be selected from the group consisting of diluting the polyalkyl (meth)acrylates to receive a lower content of solids in the base oil, concentration to receive a higher content of solids in the base oil; filtering the reaction mixture; degassing the reaction mixture (stripping, removal of volatile components); or blending the reaction mixture with further components like other polymers.

The polymers prepared according to the method of the present invention are characterized by a low residual monomer content.

A further object of the present invention is directed to a method for preparing polyalkyl (meth)acrylates, comprising the steps of:
(i) preparing a reaction mixture comprising:
(A) at least two different alkyl (meth)acrylates, comprising:
(a) 0.2 wt. % to 25 wt. % of C1-6 alkyl (meth)acrylates, preferably methyl methacrylate; and
(b) 75 wt. % to 99.8 wt. % of C7-20 alkyl (meth)acrylates, preferably C10-15 alkyl methacrylates, more preferably C12-14 alkyl methacrylates;
(B) optionally, a chain transfer agent; and
(C) optionally, a base oil;
(ii) charging the reaction mixture prepared under step (i) to a reaction vessel;
(iii) heating the reaction mixture to the desired reaction temperature;
(iv) adding 0.1 wt. % to 4 wt. %, preferably 1 wt. % to 2 wt. %, based on the total amount of monomers used, of a free radical initiator 1, either continuously or stepwise;
(v) adding, after a monomer conversion of at least 95% was achieved, 0.05 wt. % to 0.2 wt. %, based on the total amount of monomers used, of an initiator 2 and less than 1 wt. %, preferred not more than 0.5%, based on the total amount of monomers used, of an additional monomer to the reaction mixture; and (vi) optionally, further processing of the reaction mixture to receive the targeted polyalkyl (meth)acrylates, wherein the conversion is determined by measuring the residual monomer content by HPLC method (as described above).

A further object of the present invention is directed to a method for preparing polyalkyl (meth)acrylates, comprising the steps of:

(i) preparing a reaction mixture comprising:
   (A) at least two different alkyl (meth)acrylates, comprising:
      (a) 10 wt. % to 15 wt. % of C1-6 alkyl (meth) acrylates, preferably methyl methacrylate; and
      (b) 85 wt. % to 90 wt. % of C7-20 alkyl (meth) acrylates, preferably C10-15 alkyl methacrylates, more preferably C12-14 alkyl methacrylates;
   (B) optionally, a chain transfer agent; and
   (C) optionally, a base oil;
(ii) charging the reaction mixture prepared under step (i) to a reaction vessel;
(iii) heating the reaction mixture to the desired reaction temperature;
(iv) adding 0.1 wt. % to 4 wt. %, preferably 0.1 wt. % to 2 wt. %, based on the total amount of monomers used, of a free radical initiator 1, either continuously or stepwise;
(v) adding, after a monomer conversion of at least 95% was achieved, 0.05 wt. % to 0.2 wt. %, based on the total amount of monomers used, of an initiator 2 and less than 1 wt. %, preferred not more than 0.5%, based on the total amount of monomers used, of an additional monomer to the reaction mixture; and
(vi) optionally, further processing of the reaction mixture to receive the targeted polyalkyl (meth)acrylates wherein the conversion is determined by measuring the residual monomer content by HPLC method (as described above).

A further object of the present invention is directed to the polyalkyl (meth)acrylates prepared according to the method as described herein before and having a total residual monomer content of below 1% by weight, preferably below 0.7% by weight, and a residual methyl methacrylate content of less than 0.1% by weight, preferably below 0.07% by weight for copolymers containing methyl methacrylate, the residual monomer content being determined by HPLC method as described above.

The residual monomer content reduction was improved by more than 10% in all cases.

A further object of the present invention is directed to the polyalkyl (meth)acrylates prepared according to the method as described herein before and having a flash point that is higher than the flash point of a polyalkyl (meth)acrylate prepared without step (v) in the manufacturing process.

The viscosity of the resulting polymer solution is adjusted by the fraction of base oil or dilution oil (C) to be in the range from 200 cSt to 2000 cSt.

To make sure that a viscosity modifier is used in the most cost-effective way, the polymer thickening efficiency (TE) is important. TE describes the boost in kinematic viscosity at 100° C. of an oil following the addition of a specific amount of polymer.

The thickening efficiency is primarily a function of polymer chemistry and molecular weight. Large molecules are better thickeners than small ones and, at the same molecular weight, some polymer chemistries are better thickeners than others.

The polyalkyl (meth)acrylates prepared according to the present invention have the same or slightly improved thickening efficiency at 100° C. as the non-inventive products. The slight increase is related to the reduced residual monomer content of the inventive products.

A further object of the present invention is directed to the use of the polyalkyl (meth)acrylates prepared according to the method as described herein before as an additive in industrial fluids.

A further object of the present invention is directed to an industrial fluid, comprising:
(A) 0.5 wt. % to 50 wt. % of a polyalkyl (meth)acrylate prepared according to the method as described herein before;
(B) 50 wt. % to 99.5 wt. % of a base oil selected from the group consisting of API Group I, II, III, IV and V oils and mixtures thereof, preferably API Group I, II, III oils and mixtures thereof; and
(C) 0 wt. % to 5 wt. % of one or more further additives.

A further object of the present invention is directed to an industrial fluid, comprising:
(A) 0.5 wt. % to 25 wt. % of a polyalkyl (meth)acrylate prepared according to the method as described herein before;
(B) 75 wt. % to 99.5 wt. % of a base oil selected from the group consisting of API Group I, II, III, IV and V oils and mixtures thereof; and
(C) 0 wt. % to 5 wt. % of one or more further additives.

A further object of the present invention is directed to an industrial fluid that complies with EU ecolabel requirements, comprising:
(A) 0.5 wt. % to 13 wt. % of a polyalkyl (meth)acrylate prepared according to the method as described herein before;
(B) 87 wt. % to 99.5 wt. % of a biodegradable base oil selected from the group consisting of vegetable oils, API Group IV and V oils and mixtures thereof, preferably selected from API Group IV and V oils and mixtures thereof; and
(C) 0 wt. % to 5 wt. % of one or more further additives.

The content of each component (A), (B) and (C) is based on the total composition of the lubricating oil composition. In a particular embodiment, the proportions of components (A), (B) and (C) add up to 100% by weight.

The biodegradable base oil is selected from the group consisting of vegetable oils, polyalkylene glycols and synthetic esters.

Suitable commonly used vegetable oils are soybean oil, rapeseed oil, cottonseed oil, olive oil, sunflower oil, and canola oil.

Polyalkylene glycols can be selected from API Group V base oils and mixtures thereof; synthetic esters can be selected from API Group V base oils and mixture thereof.

The industrial fluid according to the present invention may also contain, as component (C), further additives selected from the group consisting of conventional VI improvers, dispersants, defoamers, detergents, antioxidants, pour point depressants, antiwear additives, extreme pressure additives, friction modifiers, anticorrosion additives, dyes and mixtures thereof.

Conventional VI improvers include hydrogenated styrene-diene copolymers (HSDs, U.S. Pat. Nos. 4,116,917, 3,772,196 and 4,788,316), especially based on butadiene and isoprene, and also olefin copolymers (OCPs, K. Marsden: "Literature Review of OCP Viscosity Modifiers", Lubrication Science 1 (1988), 265), especially of the poly(ethylene-co-propylene) type, which may often also be present in N/O-functional form with dispersing action, or PAMAs, which are usually present in N-functional form with advantageous additive properties (boosters) as dispersants, wear protection additives and/or friction modifiers (DE 1 520 696 to Röhm and Haas, WD 2006/007934 to RohMax Additives).

Compilations of VI improvers and pour point depressants for lubricant oils, especially motor oils, are detailed, for example, in T. Mang, W. Dresel (eds.): "Lubricants and Lubrication", Wley-VCH, Weinheim 2001: R. M. Mortier, S. T. Orszulik (eds.): "Chemistry and Technology of Lubricants", Blackie Academic & Professional, London 1992; or J. Bartz: "Additive für Schmierstoffe", Expert-Verlag, Renningen-Malmsheim 1994.

Appropriate dispersants include poly-(isobutylene) derivatives, for example poly(isobutylene)succinimides (PIBSIs), including borated PIBSIs; and ethylene-propylene oligomers having N/O functionalities.

Dispersants (including borated dispersants) are preferably used in an amount of 0 to 5% by weight, based on the total amount of the lubricating oil composition.

Suitable defoamers are silicone oils, fluorosilicone oils, fluoroalkyl ethers, etc.

The defoaming agent is preferably used in an amount of 0.005 to 0.1% by weight, based on the total amount of the lubricating oil composition.

The preferred detergents include metal-containing compounds, for example phenoxides; salicylates; thiophosphonates, especially thiopyrophosphonates, thiophosphonates and phosphonates; sulfonates and carbonates. As metal, these compounds may contain especially calcium, magnesium and barium. These compounds may preferably be used in neutral or overbased form.

Detergents are preferably used in an amount of 0.2 to 1% by weight, based on the total amount of the lubricating oil composition.

The suitable antioxidants include, for example, phenol-based antioxidants and amine-based antioxidants.

Phenol-based antioxidants include, for example, octadecyl-3-(3,5-di-tert-butyl-4-hydroxyphenyl)propionate; 4,4'-methylenebis(2,6-di-tert-butylphenol); 4,4'-bis(2,6-di-t-butylphenol); 4,4'-bis(2-methyl-8-t-butylphenol); 2,2'-methylenebis(4-ethyl-8-t-butylphenol); 2,2'-methylenebis(4-methyl-8-t-butyl phenol); 4,4'-butylidenebis(3-methyl-8-t-butylphenol); 4,4'-isopropylidenebis(2,6-di-t-butylphenol); 2,2'-methylenebis(4-methyl-8-nonylphenol); 2,2'-isobutylidenebis(4,6-dimethylphenol); 2,2'-methylenebis(4-methyl-8-cyclohexylphenol); 2,6-di-t-butyl-4-methylphenol; 2,6-di-t-butyl-4-ethyl-phenol; 2,4-dimethyl-8-t-butylphenol; 2,6-di-t-amyl-p-cresol; 2,6-di-t-butyi-4-(N,N'-dimethylaminomethylphenol); 4,4'thiobis(2-methyl-8-t-butylphenol); 4,4'-thiobis(3-methyl-8-t-butylphenol); 2,2'-thiobis(4-methyl-8-t-butylphenol); bis(3-methyl-4-hydroxy-5-t-butylbenzyl) sulfide; bis(3,5-di-t-butyl-4-hydroxybenzyl) sulfide; n-octyl-3-(4-hydroxy-3,5-di-t-butylphenyfpropionate; n-octadecyl-3-(4-hydroxy-3,5-di-t-butylphenyl)propionate; 2,2'-thio[diethyl-bis-3-(3,5-di-t-butyl-4-hydroxypheny) propionate], etc. Of those, especially preferred are bisphenol-based antioxidants and ester group containing phenol-based antioxidants.

The amine-based antioxidants include, for example, monoalkyldiphenylamines such as monooctykdiphenylamine, monononykdiphenylamine, etc.; dialkyldiphenylamines such as 4,4'-dibutyldiphenylamine, 4,4'-dipentykdiphenylamine, 4,4'-dihexykdiphenylamine, 4,4'-diheptykdiphenylamine, 4,4'-dioctyldiphenylamine, 4,4'-dinonykdiphenylamine, etc.; polyalkyldiphenylamines such as tetrabutyldiphenylamine, tetrahexykdiphenylamine, tetraoctyldiphenylamine, tetranonykdiphenylamine, etc.; naphthylamines, concretely alpha-naphthylamine, phenyl-alpha-naphthylamine and further alkyl-substituted phenyl-alpha-naphthylamines such as butylphenyl-alpha-naphthylamine, pentylphenyl-alpha-naphthylamine, hexylphenyl-alpha-naphthylamine, heptylphenyl-alpha-naphthylamine, octylphenyl-alpha-naphthylamine, nonylphenyl-alpha-naphthylamine, etc. Of those, diphenylamines are preferred to naphthylamines, from the viewpoint of the antioxidation effect thereof.

Suitable antioxidants may further be selected from the group consisting of compounds containing sulfur and phosphorus, for example metal dithiophosphates, for example zinc dithiophosphates (ZnDTPs), "OOS triesters"=reaction products of dithiophosphoric acid with activated double bonds from olefins, cyclopentadiene, norbomadiene, alpha-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc bis(dialkyldithiocarbamate) and methylene bis(dialkyldithiocarbamate); organophosphorus compounds, for example triaryl and trialkyl phosphites; organocopper compounds and overbased calcium- and magnesium-based phenoxides and salicylates.

Antioxidants are used in an amount of 0 to 15% by weight, preferably 0.1 to 10% by weight, more preferably 0.2 to 2% by weight, based on the total amount of the lubricating oil composition.

The pour-point depressants include ethylene-vinyl acetate copolymers, chlorinated paraffin-naphthalene condensates, chlorinated paraffin-phenol condensates, polymethacrylates, polyalkylstyrenes, etc. Preferred are polymethacrylates having a mass-average molecular weight of from 5.000 to 50.000 g/mol.

The amount of the pour point depressant is preferably from 0.1 to 1% by weight, based on the total amount of the lubricating oil composition.

The preferred antiwear and extreme pressure additives include sulfur-containing compounds such as zinc dithiophosphate, zinc di-$C_{3-12}$-alkyldithiophosphates (ZnDTPs), zinc phosphate, zinc dithiocarbamate, molybdenum dithiocarbamate, molybdenum dithiophosphate, disulfides, sulfurized olefins, sulfurized oils and fats, sulfurized esters, thiocarbonates, thiocarbamates, polysulfides, etc.; phosphorus-containing compounds such as phosphites, phosphates, for example trialkyl phosphates, triaryl phosphates, e.g. tricresyl phosphate, amine-neutralized mono- and dialkyl phosphates, ethoxylated mono- and dialkyl phosphates, phosphonates, phosphines, amine salts or metal salts of those compounds, etc.; sulfur and phosphorus-containing anti-wear agents such as thiophosphites, thiophosphates, thiophosphonates, amine salts or metal salts of those compounds, etc.

The antiwear agent may be present in an amount of 0 to 3% by weight, preferably 0.1 to 1.5% by weight, more preferably 0.2 to 0.9% by weight, based on the total amount of the lubricating oil composition.

Friction modifiers used may include mechanically active compounds, for example molybdenum disulfide, graphite (including fluorinated graphite), poly(trifluoroethylene), polyamide, polyimide; compounds that form adsorption layers, for example long-chain carboxylic acids, fatty acid esters, ethers, alcohols, amines, amides, imides; compounds which form layers through tribochemical reactions, for example saturated fatty acids, phosphoric acid and thiophosphoric esters, xanthogenates, sulfurized fatty acids; compounds that form polymer-like layers, for example ethoxylated dicarboxylic partial esters, dialkyl phthalates, methacrylates, unsaturated fatty acids, sulfurized olefins or organometallic compounds, for example molybdenum compounds (molybdenum dithiophosphates and molybdenum dithiocarbamates MoDTCs) and combinations thereof with ZnDTPs, copper-containing organic compounds.

Friction modifiers may be used in an amount of 0 to 6% by weight, preferably 0.05 to 4% by weight, more preferably 0.1 to 2% by weight, based on the total amount of the lubricating oil composition.

Some of the compounds listed above may fulfil multiple functions. ZnDTP, for example, is primarily an antiwear additive and extreme pressure additive, but also has the character of an antioxidant and corrosion inhibitor (here: metal passivator/deactivator).

The above-detailed additives are described in detail, inter alia, in T. Mang, W. Dresel (eds.): "Lubricants and Lubrication", Wley-VCH, Weinheim 2001; R. M. Mortier, S. T. Orszulik (eds.): "Chemistry and Technology of Lubricants".

Figure 1:
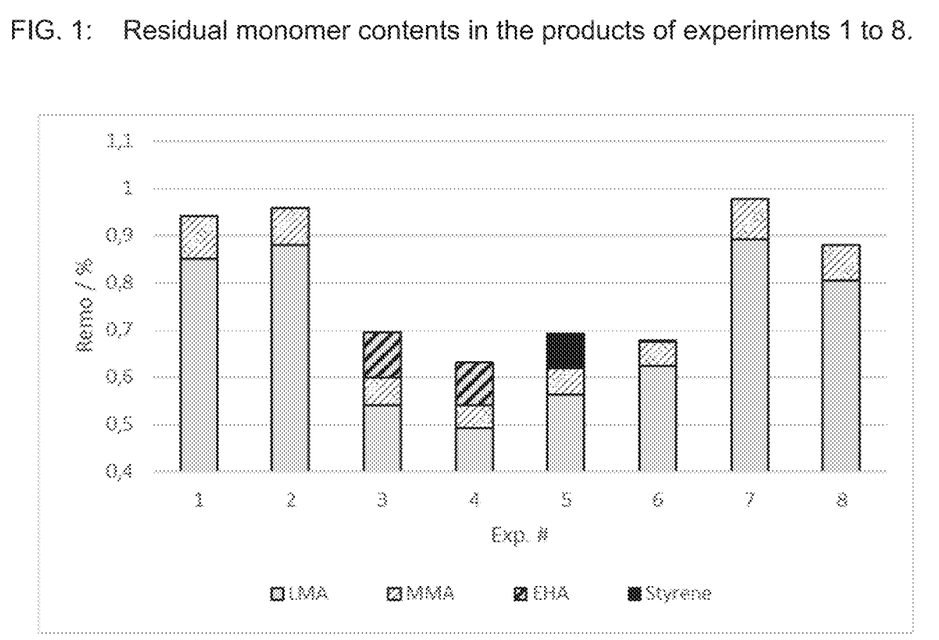
FIG. 1 shows the residual monomer contents in the products of experiments 1 to 8.

FIG. 1 illustrates the residual monomer contents in the products of experiments 1 to 8.

Figure 2:
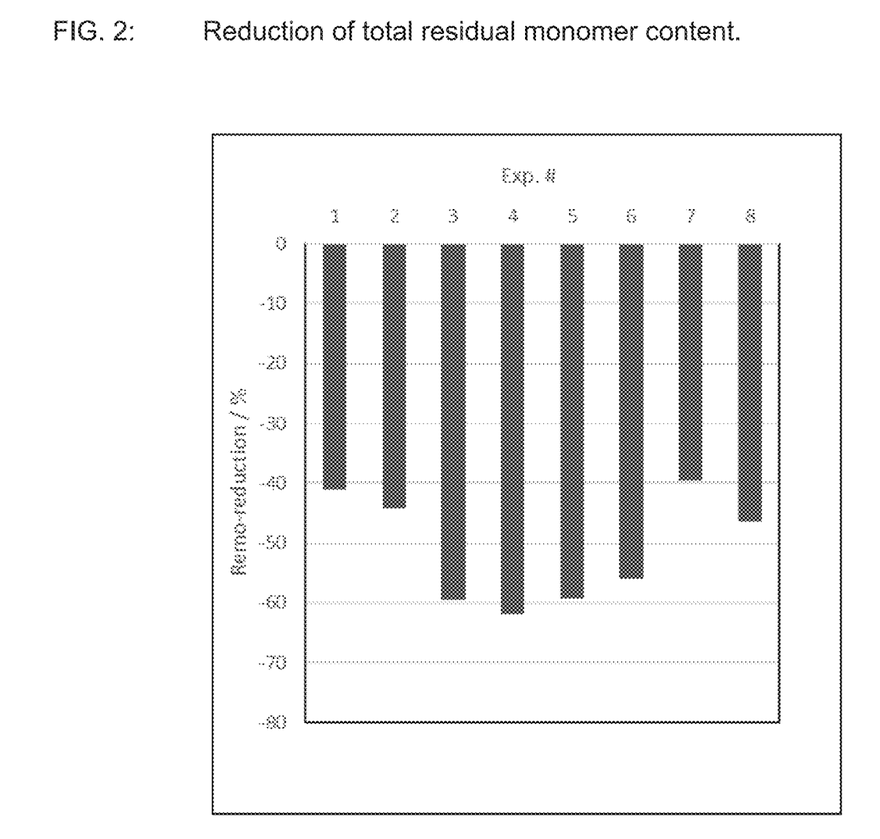
FIG. 2 shows the reduction of total residual monomer content in experiments 1 to 8.

FIG. 2 shows the reduction of total residual monomer content in experiments 1 to 8.

Figure 3:
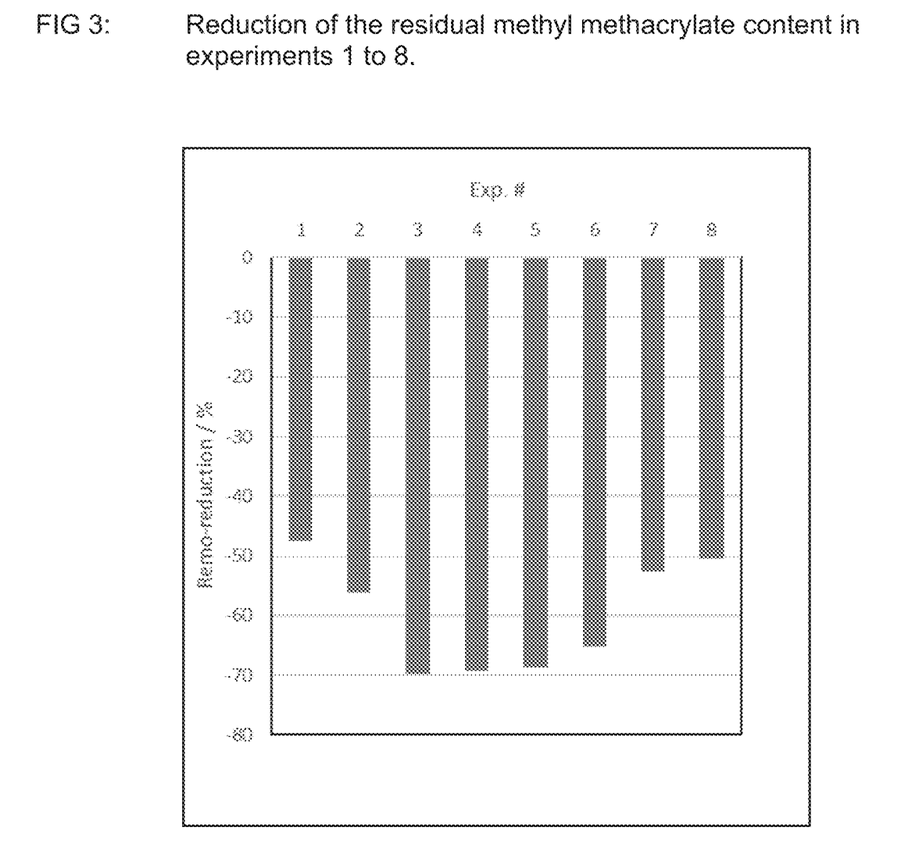
FIG. 3 shows the reduction of the residual methyl methacrylate content in experiments 1 to 8.

FIG. 3 shows the reduction of the residual methyl methacrylate content in experiments 1 to 8.

Figure 4:
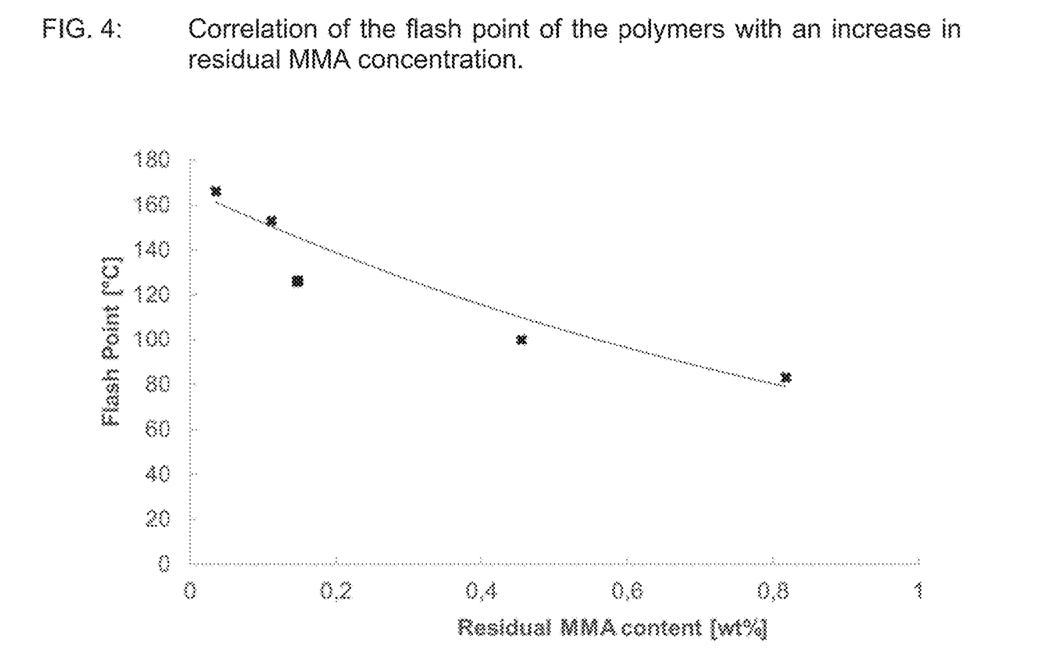
FIG. 4 shows the correlation of the flash point of the polymers with an increase in residual MMA concentration.

FIG. 4 shows the correlation of the flash point of the polymers with an increase in residual MMA concentration.

The invention has been further illustrated by the following non-limiting examples.

EXPERIMENTAL PART

Abbreviations

C10-15 AMA C12-15 alkyl methacrylate, 77% branched and 23% linear (average molecular weight=279 g/mol)
nDDM n-dodecyl mercaptane
tDDM tert-dodecyl mercaptane
EHA 2-ethylhexyl acrylate
HPLC high performance liquid chromatography
KV kinematic viscosity measured according to ASTM D445
KV100 kinematic viscosity measured @ 100° C. according to ASTM D445
LIMA C12-15 alkyl methacrylate, 60% branched and 40% linear (molecular weight=273 g/mol)
LMA lauryl methacrylate, 73% C12, 27% C14; all linear (molecular weight=262 g/mol)
MMA methyl methacrylate (molecular weight=100.12 g/mol)
$M_w$ weight-average molecular weight
$M_n$ number-average molecular weight
PDI polydispersity index1
ReMo residual monomer(s)
Sty styrene
TBPEH tert-butylperoxy-2-ethylhexanoate
TE thickening efficiency measured as kinematic viscosity at 100° C. in test oil Test Methods The polyalkyl (meth)acrylates prepared according to the present invention and the comparative examples were characterized with respect to their molecular weight, PDI and their bulk viscosity.

The molecular weight and the polydispersity of the polyalkyl (meth)acrylates can be determined by known methods. For example, gel permeation chromatography (GPC) can be used. It is equally possible to use an osmometric process, for example vapor phase osmometry, to determine the molecular weights. The processes mentioned are, for example, described in: P. J. Flory, "Principles of Polymer Chemistry" Cornell University Press (1953), Chapter VII, 266-316 and "Macromolecules, an Introduction to Polymer Science", F. A. Bovey and F. H. Wnslow, Editors, Academic Press (1979), 296-312 and W. W. Yau, J. J. Kirkland and D. D. Bly, "Modern Size Exclusion Liquid Chromatography, John Wiley and Sons, New York, 1979. To determine the molecular weights of the polymers presented herein, preference is given to using gel permeation chromatography.

The weight-average molecular weights ($M_w$) of the polyalkyl (meth)acrylates were determined by gel permeation chromatography (GPC) using polymethyl methacrylate calibration standards according to DIN 55672-1 using the following measurement conditions:

Eluent: Tetrahydrofuran (THF), continuously distilled and circulated by pump
Oven temperature: 35° C.
Column: the column set consists of four columns: two columns SDV 106 Å, one column SDV 104 Å and one column SDV 103 Å (PSS Standards Service GmbH, Mainz, Germany), all with the size of 300×8 mm and an average particle size of 10 μm
Flow rate: 1 mL/min
Injected volume: 100 μL
Instrument: Agilent 1100 series consisting of an autosampler, pump and column oven
Detection device: a refractive index detector from Agilent 1260 series.

According to the present invention, the residual monomer contents were determined using the following HPLC method with the following test conditions:

Detection: UV, 200 nm
Column: LiChrospher 60-5 Si (125 mm×3 mm, 5 μm)
Eluent: n-hexane$_{LiChr.}$:THF$_{LiChr.}$=99.6:0.4
Flow rate: 0.9 mL/min
Injected volume: 20 μL
Quantification is made by using an external, linear multipoint calibration using calibration standards. The calibration standard corresponds to the monomer of which the residual content is determined. A sample is prepared by adding 100 mg of the corresponding monomer to a 25 mL flask that is subsequently filled up with the eluent.

General Polymerization Procedure 1 (Examples 1-9)

A reaction mixture was prepared by combining 187.72 g (1.87 mol; 13.0%, based on the total amount of the monomers used) methyl methacrylate, 1256.28 g (4.80 mol; 87.0%, based on the total amount of the monomers used) lauryl methacrylate, 10.4 g (0.72%, based on the total amount of the monomers used) chain transfer agent nDDM and 556 g paraffinic oil (Chevron 100N).

The mixture was charged to a 3-liter reactor equipped with a thermometer, a temperature controller, an additional funnel, a purge gas inlet and a water-cooled reflux condenser with a purge gas outlet and then inerted with dry ice ($CO_2$)

and heated to 110° C. under 15 L/h nitrogen flow at 150 rpm stirrer speed. When the reaction temperature was reached, a total of 14.44 g (1%, based on the total amount of the monomers used) of an initiator mixture (3.61 g; 0.25%, based on the total amount of the monomers used) tert-butylperoxy-2-ethylhexanoate in 10.83 g paraffinic oil (Chevron 100N) was added in 3 steps: 5% of the initiator solution within 1 h, 25% within the second hour and 70% within the third hour. After all of initiator solution was charged, the mixture was cooled down to 100° C. for a 1 h holding period.

The above-described process yielded 1994.23 g of a polymer solution having a crude polymer solids content of about 71.2% by weight.

The post-treatment of the polymer solution is described in the following.

73% within the third hour. After all of initiator solution was charged, the mixture had a 1 h holding period.

The post-treatment of the polymer is described in the following.

Post-Treatment of the Polymer Solutions 2

After the 1 h holding period, the mixture was treated with initiator (4 g tert-butylperoxy-2-ethylhexanoate; 0.2%, based on the total amount of the monomers used). Another 3 h holding period followed. Then the mixture was treated with another initiator shot (4 g tert-butylperoxy-2-ethylhexanoate; 0.2%, based on the total amount of the monomers used) and with 10 g of additional monomer (2-ethylhexyl acrylate) just before the initiator was added. The mixture was stirred at reaction temperature overnight and dropped the next morning.

The described process yielded 2000 g (without additional monomer) or 2010 g (when additional monomer was added) of a polymer having a crude polymer solids content of 100%.

TABLE 1a

Post-treatment of the polymer solutions based on a monomer mixture of 187.72 g methyl methacrylate (MMA) and 1256.28 g lauryl methacrylate (LMA) with initiator chaser shot and additional monomer shot at 100° C.

| Example # | Initiator process | Additional monomer | KV100 [mm$^2$/s] | TE100[] [mm$^2$/s] | VI[] |
|---|---|---|---|---|---|
| 1[*] | Chaser shot | — | 844 | 10.84 | 164 |
| 2[*] | Chaser shot | — | 837 | 10.85 | 163 |
| 3 | Chaser shot | 7.2 g EHA | 893 | 10.97 | 164 |
| 4 | Chaser shot | 7.2 g EHA | 862 | 10.94 | 163 |
| 5 | Chaser shot | 7.2 g Sty | 913 | 10.99 | 164 |
| 6 | Chaser shot | 7.2 g Sty | 847 | 10.92 | 163 |
| 7[*] | 1.5 h dosing | — | 869 | 10.96 | 164 |
| 8[*] | 1.5 h dosing | — | 847 | 10.96 | 164 |
| 9 | Chaser shot | 3.6 g LMA | 854 | 10.99 | 165 |

[*]comparative example
[**]measured at 12.0% treat rate in hydrocarbon-based test oil with KV100 of 5.42 mm$^2$/s, VI of 101 and an aniline point of 103° C.

Post-Treatment of the Polymer Solutions 1

After the 1 h holding period at 100° C., the samples were treated with initiator solution (1.44 g tert-butylperoxy-2-ethylhexanoate in 4.33 g paraffinic oil Chevron 100N) and, partially, with 3.6 g or 7.2 g of additional monomer just before the initiator is added. Another 1 h holding period followed. The described process yielded 2000 g (without additional monomer) or 2003.6 g and 2007.2 g (when additional monomer was added), respectively, of a polymer solution having a crude polymer solids content in the range of 72.2% to 72.6%, respectively.

General Polymerization Procedure 2 (Examples 10-14)

A reaction mixture was prepared by combining 1980.8 g (7.26 mol; 99.79%, based on the total amount of the monomers used) of LIMA, 4.2 g (0.042 mol; 0.21%, based on the total amount of the monomers used) of methyl methacrylate, 39 g (1.95%, based on the total amount of the monomers used) chain transfer agent nDDM and 29 g (1.45%, based on the total amount of the monomers used) chain transfer agent tDDM.

The mixture was charged to a 3-liter reactor equipped with a thermometer, a temperature controller, an additional funnel, a purge gas inlet and a water-cooled reflux condenser with a purge gas outlet and then inerted with dry ice ($CO_2$) and heated to 110° C. under 15 L/h nitrogen flow at 150 rpm stirrer speed. When the reaction temperature was reached, a total of 20 g (1%, based on the total amount of monomers used) of an initiator solution (5 g; 0.25%, based on the total amount of the monomers used) tert-butylperoxy-2-ethylhexanoate in 15 g LIMA was added in 3 steps: 2% of the initiator solution within 1 h, 25% within the second hour and Examples 1, 2, 7 and 8 are comparative examples as the process for their preparation did not include the addition of a specific amount of additional monomer at the end of the polymerization reaction during post-treatment; only an additional initiator shot was added.

Examples 3-6 and 9 are in accordance with the invention as the process for their preparation included an additional initiator shot at the end of the polymerization reaction as well as an addition of EHA (examples 3 and 4) or styrene (examples 5 and 6) or LMA (example 9).

The polyalkyl (meth)acrylate products prepared according to the present invention contain 13% by weight of methyl methacrylate and 87% of LMA.

TABLE 1b

Post-treatment of the polymer solutions based on a monomer mixture of 1980.8 g of LIMA and 4.2 g of MMA with initiator chaser shot and additional monomer shot at 110° C.

| Example # | Initiator process | Additional monomer | KV100 [mm$^2$/s] | VI[**] |
|---|---|---|---|---|
| 10[*] | Chaser shot | — | 471 | 196 |
| 11[*] | Chaser shot | — | 501 | 196 |
| 12[*] | Chaser shot | — | 502 | 196 |
| 13 | Chaser shot | 10 g EHA | 502 | 196 |
| 14 | Chaser shot | 10 g EHA | 511 | 195 |

[*]comparative example

Examples 10-12 are comparative examples as the process for their preparation did not include the addition of a specific amount of additional monomer at the end of the polymerization reaction during post-treatment; only an additional initiator shot was added.

Examples 13 and 14 are in accordance with the invention as the process for their preparation included an additional initiator shot at the end of the polymerization reaction as well as an addition of EHA.

The polyalkyl (meth)acrylate products prepared according to the present invention contain 0.21% by weight of methyl methacrylate and 99.79% of LIMA.

The molecular weights and PDIs of the polymers prepared according to the present invention are disclosed in the following Table 2.

TABLE 2

Molecular weights of the polymers prepared.

| Example # | $M_n$ [g/mol] | $M_w$ [g/mol] | PDI |
|---|---|---|---|
| 1*) | 27,900 | 53,800 | 1.93 |
| 2*) | 28,400 | 54,100 | 1.91 |
| 3 | 28,100 | 54,600 | 1.95 |
| 4 | 28,300 | 54,500 | 1.92 |
| 5 | 28,600 | 54,600 | 1.9 |
| 6 | 27,800 | 53,900 | 1.94 |
| 7*) | 29,100 | 55,200 | 1.9 |
| 8*) | 29,200 | 55,100 | 1.89 |
| 9 | 27,900 | 53,600 | 1.92 |
| 10*) | 8,860 | 15,500 | 1.75 |
| 11*) | 9,000 | 15,700 | 1.74 |
| 12*) | 8,930 | 15,500 | 1.73 |
| 13 | 8,940 | 15,400 | 1.72 |
| 14 | 8,980 | 15,400 | 1.72 |

*)comparative example it is shown that all working examples have a weight-average molecular weight $M_w$ in the very narrow range of 53,600 g/mol (example 9) to 54,600 g/mol (examples 3 and 5) and 15,400 (examples 13 and 14), respectively. The PDIs are between 1.7 and 2.0.

TABLE 3

Product modifications with initiator shots and for the inventive examples with additional monomer.

| Example # | TBPEH [wt.%] | EHA [wt. %] | Sty [wt. %] | LMA [wt. %] | KV100 [mm$^2$/s] |
|---|---|---|---|---|---|
| 1*) | 0.1 | — | — | — | 844 |
| 2*) | 0.1 | — | — | — | 837 |
| 3 | 0.1 | 0.5 | — | — | 893 |
| 4 | 0.1 | 0.5 | — | — | 862 |
| 5 | 0.1 | — | 0.5 | — | 913 |
| 6 | 0.1 | — | 0.5 | — | 847 |
| 7*) | 0.1[1] | — | — | — | 869 |
| 8*) | 0.1[1] | — | — | — | 847 |
| 9 | 0.1 | — | — | 0.25 | 854 |
| 10*) | 0.2 | — | — | — | 471 |
| 11*) | 0.2 | — | — | — | 501 |
| 12*) | 0.2 | — | — | — | 502 |
| 13 | 0.2 | 0.5 | — | — | 502 |
| 14 | 0.2 | 0.5 | — | — | 511 |

*)comparative example
[1]slow dosage over 1.5 h

Examples 1-2 and 7-8 are comparative examples as there was no additional monomer added in the post-treatment step. Examples 3-6 and 9 are in accordance with the invention as the process for their preparation included an additional initiator shot at the end of the polymerization reaction as well as an addition of EHA (examples 3 and 4) or styrene (examples 5 and 6) or LMA (example 9). It can be seen that the kinematic viscosities measured at 100° C. are all within a narrow range of 837 mm$^2$/s (example 2) and 913 mm$^2$/s (example 5). That means that all examples show almost the same bulk % viscosity.

The residual monomer contents of the examples and comparative examples are listed in the following Table 4.

TABLE 4

Residual monomer content of the polymers prepared.

| Example # | ReMo LMA [%] | ReMo LIMA [%] | ReMo MMA [%] | ReMo EHA [%] | ReMo Sty [%] | ReMo Sum [%] | ReMo Δ [%] |
|---|---|---|---|---|---|---|---|
| 1*) | 0.8509 | — | 0.0892 | — | — | 0.9401 | 47 |
| 2*) | 0.8814 | — | 0.0761 | — | — | 0.9575 | 56 |
| 3 | 0.5412 | — | 0.0586 | 0.0957 | — | 0.6955 | 70 |
| 4 | 0.4926 | — | 0.0493 | 0.0859 | — | 0.6314 | 69 |
| 5 | 0.5621 | — | 0.0574 | — | 0.0720 | 0.6915 | 69 |
| 6 | 0.6231 | — | 0.0520 | — | 0.0030 | 0.6781 | 65 |
| 7*) | 0.8925 | — | 0.0854 | — | — | 0.9779 | 53 |
| 8*) | 0.8042 | — | 0.0750 | — | — | 0.8792 | 50 |
| 9 | — | — | — | — | — | 0.7509 | — |
| 10*) | — | 0.9113 | <0.002 | — | — | 0.9113 | — |
| 11*) | — | 0.8326 | <0.002 | — | — | 0.8326 | — |
| 12*) | — | 0.8337 | <0.002 | — | — | 0.8337 | — |
| 13 | — | 0.4672 | <0.002 | 0.1263 | — | 0.5935 | — |
| 14 | — | 0.4176 | <0.002 | 0.1189 | — | 0.5365 | — |

*)comparative example

It was surprisingly found that the initiator addition at the end of the polymerization was more efficient when additional monomer was added as well. The final residual monomer content of the polyalkyl (meth)acrylates prepared with an additional initiator shot as well as an additional monomer shot (examples 3-6 and 9 and 13-14) was lower than without the addition of fresh monomer (examples 1, 2, 7, and 8 and 10-12). The reduction was obvious for the total residual monomer and also for the individual monomers, here methyl methacrylate and the sum of long chain (meth) acrylates or the sum of methacrylate and styrene.

The residual monomer content reduction was improved over the comparative examples by more than 10% in all cases as shown for the individual monomers (see FIG. 1).

The bulk viscosity (measured as KV100) and thickening efficiency of the product did not change significantly and was within the error of repeatability. Solid contents were generally slightly increased what makes the process to produce a polymeric product more economic.

Together with the effect of lower residual monomer content in the polyalkyl (meth)acrylates prepared according to the present invention a reduction of odor was also observed. The results are shown in the following Table 5.

TABLE 5

Odor rating of the examples and comparative examples according to the present invention.

| Experiment # | ReMo Sum [%] | Odor rating average**) [team of 5 test persons] |
|---|---|---|
| 1*) | 0.9401 | 5 |
| 2*) | 0.9575 | 5 |
| 3 | 0.6955 | 3 |
| 4 | 0.6314 | 2 |
| 5 | 0.6915 | 4 |
| 6 | 0.6781 | 3 |
| 7*) | 0.9779 | 5 |
| 8*) | 0.8792 | 5 |
| 9 | 0.7509 | 3 |

*)comparative example
**)evaluation system: 1 = no smell up to 6 = intense smell It can be concluded that a reduced residual monomer content goes along with a reduced odor.

The reduction of residual monomer in the products, especially of methyl methacrylate, can be correlated to increased flash points.

A calibration curve was determined by using the Pensky-Martens closed-up flash point test according to ASTM D93, ISO 2719. Different polymer solutions A to E were prepared based on a polymer comprising 87 wt. % of LMA and 13 wt. % of MMA (74% polymer in Chevron Group II base oil). Base polymer A was prepared according to the general polymerization procedure 1 as described further above, but without any post treatment.

Volatile compounds were then removed from polymer A with a rotary evaporator, resulting in polymer B.

To polymer B were then added different amounts of MMA: about 0.1%, resulting in polymer C; about 0.4%, resulting in polymer D; and about 0.8%, resulting in polymer E.

Corresponding values for the residual monomer contents are shown in the following Table 6.

TABLE 6

Correlation between residual MMA content and flash point of polymers A to E comprising 13 wt. % of MMA and 87 wt. % of LMA (74% polymer in Chevron Group II base oil).

| Example # | ReMo LMA [%] | ReMo MMA [%] | Flash point [° C.] |
|---|---|---|---|
| A | 0.9557 | 0.1474 | 126 |
| B | 0.9727 | 0.0352 | 166 |
| C | 0.9600 | 0.1116 | 153 |
| D | 0.9674 | 0.4544 | 100 |
| E | 0.9702 | 0.8173 | 83 |

A clear correlation of the flash point with an increase in residual MMA concentration can be seen, i.e. the flash point is falling with increasing residual MMA content. The correlation is visualized in FIG. 4.

The concentration of residual LMA was nearly identical in examples A to E.

The invention claimed is:

1. A method for preparing a polyalkyl (meth)acrylate, the method comprising:
   (i) preparing a reaction mixture comprising:
      (A) at least two different alkyl (meth)acrylates;
      (B) optionally, a chain transfer agent; and
      (C) optionally, a base oil,
   (ii) charging the reaction mixture prepared under (i) to a reaction vessel;
   (iii) heating the reaction mixture to a desired reaction temperature;
   (iv) adding 0.1 wt. % to 4 wt. %, based on a total amount of monomers used, of a free radical initiator 1, either continuously or stepwise;
   (v) adding, after a monomer conversion of at least 95% was achieved, 0.05 wt. % to 0.2 wt. %, based on the total amount of monomers used, of an initiator 2, and less than 1 wt. %, based on the total amount of monomers used, of an additional monomer selected from the group consisting of C4-14 alkyl acrylates, C4-14 alkyl methacrylates, C4-14 alkyl maleates, C4-14 alkyl fumarates, and styrene, to the reaction mixture; and
   (vi) optionally, further processing of the reaction mixture to receive the targeted polyalkyl (meth)acrylate,
   wherein the monomer conversion is determined by measuring a residual monomer content by high performance liquid chromatography (HPLC) method.

2. The method according to claim 1, wherein the at least two different alkyl (meth)acrylates comprise:
   (a) 0.2 wt. % to 50 wt. % of at least one C1-6 alkyl (meth)acrylate;
   (b) 50 wt. % to 99.8 wt. % of at least one C7-20 alkyl (meth)acrylate; and
   (c) 0 wt. % to 10 wt. % of one or more further comonomers,
   based on a total amount of the at least two different alkyl (meth)acrylates.

3. The method according to claim 2, wherein the at least one C1-6 alkyl (meth)acrylate is methyl methacrylate.

4. The method according to claim 2, wherein the at least one C7-20 alkyl (meth)acrylate is a C10-15 alkyl methacrylate.

5. The method according to claim 2, wherein the at least one C7-20 alkyl (meth)acrylate is selected from the group consisting of linear or branched C10-15 alkyl methacrylates and mixtures of linear and branched C10-15 alkyl methacrylates.

6. The method according to claim 2, wherein the at least one C7-20 alkyl (meth)acrylate is lauryl methacrylate.

7. The method according to claim 1, wherein the chain transfer agent is selected from the group consisting of n-dodecyl mercaptane, tert-dodecyl mercaptane, 2-mercaptoethanol, and 2-ethylhexyl-thioglycolate.

8. The method according to claim 1, wherein the free radical initiator 1 and the initiator 2 are independently selected from the group consisting of azo initiators and peroxy compounds.

9. The method according to claim 1, wherein the additional monomer is selected from the group consisting of 2-ethylhexyl acrylate, lauryl methacrylate, and styrene.

10. The method according to claim 1, comprising:
 (i) preparing the reaction mixture comprising:
  (A) the at least two different alkyl (meth)acrylates, comprising:
   (a) 0.2 wt. % to 25 wt. % of at least one C1-6 alkyl (meth)acrylates; and
   (b) 75 wt. % to 99.8 wt. % of at least one C7-20 alkyl (meth)acrylates;
  (B) optionally, the chain transfer agent; and
  (C) optionally, the base oil;
 (ii) charging the reaction mixture prepared under (i) to the reaction vessel;
 (iii) heating the reaction mixture to the desired reaction temperature;
 (iv) adding 0.1 wt. % to 4 wt. %, based on the total amount of monomers used, of the free radical initiator 1, either continuously or stepwise;
 (v) adding, after the monomer conversion of at least 95% was achieved, 0.05 wt. % to 0.2 wt. %, based on the total amount of monomers used, of the initiator 2, and less than 1 wt. %, based on the total amount of monomers used, of the additional monomer selected from the group consisting of C4-14 alkyl acrylates, C4-14 alkyl methacrylates, C4-14 alkyl maleates, C4-14 alkyl fumarates, and styrene, to the reaction mixture; and
 (vi) optionally, further processing of the reaction mixture to receive the targeted polyalkyl (meth)acrylate,
 wherein the conversion is determined by measuring the residual monomer content by HPLC method.

11. A polyalkyl (meth)acrylate prepared according to the method of claim 1, having a total residual monomer content of below 1% by weight, the residual monomer content being determined by HPLC method.

12. A polyalkyl (meth)acrylate prepared according to the method of claim 1, having a residual methyl methacrylate content of below 0.1% by weight, the residual monomer content being determined by HPLC method.

13. A method, comprising:
 adding an additive to an industrial fluid, wherein the additive is the polyalkyl (meth)acrylate according to claim 11.

14. An industrial fluid, comprising:
 (A) 0.5 wt. % to 50 wt. % of the polyalkyl (meth)acrylate prepared according to claim 1;
 (B) 50 wt. % to 99.5 wt. % of a base oil selected from the group consisting of API Group I, II, III, IV, and V oils, and mixtures thereof; and
 (C) 0 wt. % to 5 wt. % of one or more further additives.

15. An industrial fluid, comprising:
 (A) 0.5 wt. % to 25 wt. % of the polyalkyl (meth)acrylate prepared according to claim 1;
 (B) 75 wt. % to 99.5 wt. % of a base oil selected from the group consisting of hydrocarbon-based API Group I, II, III, IV, and V oils, and mixtures thereof; and
 (C) 0 wt. % to 5 wt. % of one or more further additives.

16. The industrial fluid according to claim 14, wherein component (C) is selected from the group consisting of conventional VI improvers, dispersants, defoamers, detergents, antioxidants, pour point depressants, antiwear additives, extreme pressure additives, friction modifiers, anticorrosion additives, dyes, and mixtures thereof.

17. The method according to claim 1, wherein the additional monomer is a C4-14 alkyl acrylate or styrene.

18. The method according to claim 7, wherein the chain transfer agent is selected from the group consisting of n-dodecyl mercaptane, tert-dodecyl mercaptane, and 2-mercaptoethanol.

19. The method according to claim 8, wherein the free radical initiator 1 and the initiator 2 are independently selected from the group consisting of 2,2'-azobis(2-methylbutyronitrile), tert-butylperoxy-2-ethylhexanoate, tert-amylperoxy-2-ethylhexanoate, 1,1-di-tert-butylperoxy-3,3,5-trimethylcyclohexan, tert-butyl-peroxybenzoate, tert-butylperoxy-3,5,5-trimethylhexanoat, and 2,2-di(tert-butylperoxy) butane.

20. The method according to claim 9, wherein the additional monomer is 2-ethylhexyl acrylate or styrene.

* * * * *